United States Patent
Yun et al.

(10) Patent No.: US 10,863,377 B2
(45) Date of Patent: Dec. 8, 2020

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,026

(22) PCT Filed: Apr. 10, 2019

(86) PCT No.: PCT/KR2019/004246
§ 371 (c)(1),
(2) Date: Jul. 3, 2019

(87) PCT Pub. No.: WO2020/004782
PCT Pub. Date: Jan. 2, 2020

(65) Prior Publication Data
US 2020/0008089 A1 Jan. 2, 2020

(30) Foreign Application Priority Data

Jun. 27, 2018 (KR) .......................... 10-2018-0074261
Jun. 28, 2018 (KR) .......................... 10-2018-0074545
(Continued)

(51) Int. Cl.
*H04W 24/10* (2009.01)
*H04B 7/0426* (2017.01)
(Continued)

(52) U.S. Cl.
CPC .......... *H04W 24/10* (2013.01); *H04B 7/0426* (2013.01); *H04W 52/42* (2013.01); *H04W 52/58* (2013.01); *H04W 84/12* (2013.01)

(58) Field of Classification Search
None
See application file for complete search history.

(56) References Cited

U.S. PATENT DOCUMENTS 9,479,958 B2 * 10/2016 Trainin ................. H04W 24/10
9,648,383 B2 *  5/2017 Kim ...................... H04W 16/14
(Continued)

FOREIGN PATENT DOCUMENTS

KR       1020050101070           10/2005

OTHER PUBLICATIONS

IEEE 802.11-18/1153r01; "Resolution of MIMO-related CIDs", Intel, LG electronics (Year: 2018).*
(Continued)

*Primary Examiner* — Kodzovi Acolatse
(74) *Attorney, Agent, or Firm* — Lee, Hong, Degerman, Kang & Waimey PC

(57) ABSTRACT

Provided are a method and apparatus for transmitting a frame in a wireless LAN (WLAN) system. Specifically, a first station (STA) transmits a Link Measurement Request frame requesting Transmit Power Control (TPC) information to a second STA. The first STA receives a Link Measurement Report frame from the second STA. The Link Measurement Report frame being transmitted as a response to the Link Measurement Request frame. The Link Measurement Request frame includes a TPC Configuration field. The TPC Configuration field includes a first sub-field and a second sub-field. The first sub-field includes information on whether or not the Link Measurement Request frame is transmitted through a channel on which channel aggregation (Continued)

is performed. The second sub-field includes information on a number of transmit chains being used for transmitting the Link Measurement Request frame. If the Link Measurement Request frame is transmitted through the channel on which the channel aggregation is performed, the number of transmit chains is equal to an even number.

15 Claims, 32 Drawing Sheets

(30) Foreign Application Priority Data

| Jun. 28, 2018 | (KR) | 10-2018-0074846 |
|---|---|---|
| Jul. 3, 2018 | (KR) | 10-2018-0076883 |
| Jul. 3, 2018 | (KR) | 10-2018-0076885 |
| Jul. 5, 2018 | (KR) | 10-2018-0078066 |

(51) Int. Cl.
*H04W 52/58* (2009.01)
*H04W 52/42* (2009.01)
*H04W 84/12* (2009.01)

(56) References Cited

U.S. PATENT DOCUMENTS

| 2006/0018284 | A1 | 1/2006 | Rudolf et al. | |
| 2012/0182893 | A1* | 7/2012 | Trainin | H04W 52/245 370/252 |
| 2014/0029453 | A1* | 1/2014 | Trainin | H04W 24/10 370/252 |
| 2014/0079016 | A1* | 3/2014 | Dai | H04L 5/0041 370/330 |
| 2015/0156732 | A1* | 6/2015 | Trainin | H04W 52/245 370/329 |
| 2015/0319700 | A1* | 11/2015 | Oteri | H04W 52/28 455/127.1 |
| 2016/0119883 | A1 | 4/2016 | Lee et al. | |
| 2016/0285522 | A1* | 9/2016 | Kasher | H04B 7/043 |
| 2017/0054470 | A1* | 2/2017 | Reza | H04B 1/44 |
| 2017/0257201 | A1* | 9/2017 | Eitan | H04L 27/2613 |
| 2018/0227734 | A1* | 8/2018 | Lee | H04L 5/001 |
| 2019/0045453 | A1* | 2/2019 | Da Silva | H04W 72/0446 |
| 2019/0090253 | A1* | 3/2019 | Da Silva | H04W 72/085 |
| 2019/0268972 | A1* | 8/2019 | Chen | H04L 5/0064 |
| 2019/0297518 | A1* | 9/2019 | Chen | H04W 24/10 |

OTHER PUBLICATIONS

PCT International Application No. PCT/KR2019/004246, International Search Report dated Jul. 18, 2019, 4 pages.
Kedem, O. et al., "Resolution of multiple antenna CCA and MIMO Channel Access CIDs", IEEE P802.11 Wireless LANs, doc.: IEEE 802.11-18/0782r2, May 2018, 8 pages.
Fischer, M. et al., "Link Transmit Power Text", IEEE P802.11 Wireless LANs, doc.: IEEE 802.11-17/0123r2, Sep. 2017, 11 pages.
Korean Intellectual Property Office Application No. 10-2019-7016927, Office Action dated Jan. 16, 2020, 6 pages.
European Patent Office Application Serial No. 19731581.5, Search Report dated Feb. 5, 2020, 10 pages.
Kim, J. et al., "BRP for channel aggregation," IEEE P802.11 Wireless LANs, Retrieved from the Internet, Nov. 2017, XP068122399, 10 pages.
The 802.11 Working Group of the LAN/MAN Standards Committee of the IEEE Computer Society: "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7," IEEE P802.11ay/D1.2, Apr. 2018, 581 pages.
Yee, J. et al., " CID 125 Transmit Power Control Clarifications," IEEE P802.11 Wireless LANs, doc.: IEEE 802.11-11/0071r0, Jan. 2011, 4 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 16

| Category | Radio Measurement Action | Dialog Token | Transmit Power Used | Max Transmit Power | TPC Configuration | Transmit Power Information |
|---|---|---|---|---|---|---|
| 1 | 1 | 1 | 1 | 1 | 1 | 0 or 2xNTX |

Octets:

| Category | Radio Measurement Action | Dialog Token | Transmit Power Used | Max Transmit Power | EDMG TPC Configuration | EDMG TPC Measurement Request |
|---|---|---|---|---|---|---|
| 1 | 1 | 1 | 1 | 1 | 1 | 0 or 2xNTX |

Octets:

Bits:  1  3  4

FIG. 18

| TX Antenna ID$_0$ | Transmit Power Used$_0$ | Max Transmit Power$_0$ | ... | TX Antenna ID$_{NTX}$ | Transmit Power Used$_{NTX}$ | Max Transmit Power$_{NTX}$ |
|---|---|---|---|---|---|---|
| 1 | 1 | 1 | | 1 | 1 | 1 |

Octets:

FIG. 19

| Transmit Power Used$_1$ | Max Transmit Power$_1$ | ... | Transmit Power Used$_{NTX}$ | Max Transmit Power$_{NTX}$ |
|---|---|---|---|---|
| 1 | 1 | | 1 | 1 |

Octets:

FIG. 20

| Element ID | Length | Activity | MSC | Link Margin | SNR | Reference Timestamp |
|---|---|---|---|---|---|---|
| 1 | 1 | 1 | 1 | 1 | 1 | 1 |

Octets

| Rate Adaptation Control | Parameters Across Rx Chains | Parameters Across PPDUs | Parameters Across LDPC Codewords | Parameters Across SC Blocks Or ODFM Symbols |
|---|---|---|---|---|
| 2 | 0 or NRX | 0 or 2xNSTS | 0 or 8xNSTS | 0 or 4xNSTS |

Octets

| Measurement configuration | EDMG Link Measurement |
|---|---|
| 1 | 0 or 2xN |

Octets

FIG. 21

Octets: | Element ID | Length | Activity | MSC | Link Margin | SNR | Reference Timestamp |
|---|---|---|---|---|---|---|
| 1 | 1 | 1 | 1 | 1 | 1 | 4 |

Octets: | Rate Adaptation Control/EDMG TPC | Parameters Across RX Chains | Parameters Across PPDUs | Parameters Across LDPC Codewords | Parameters Across SC Blocks Or OFDM Symbols | EDMG TPC |
|---|---|---|---|---|---|
| 5 | 0 or NRX | 0 or 2xNSTS | 0 or 8xNSTS | 0 or 4xNSTS | 0 or 2xNRX |

Octets:     1           1

FIG. 26

| Element ID | Length | Activity | EDMG Activity | Reference Timestamp |
|---|---|---|---|---|
| 1 | 1 | 1 | 0 or N | 4 |

Octets:

SIGNAL TRANSMISSION/RECEPTION METHOD IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2019/004246, filed on Apr. 10, 2019, which claims the benefit of earlier filing date and right of priority to Korean Application Nos. 10-2018-0074261, filed on Jun. 27, 2018, 10-2018-0074846, filed on Jun. 28, 2018, 10-2018-0074545, filed on Jun. 28, 2018, 10-2018-0076885, filed on Jul. 3, 2018, 10-2018-0076883, filed on Jul. 3, 2018, and 10-2018-0078066, filed on Jul. 5, 2018, the contents of which are all incorporated by reference herein in their entirety.

BACKGROUND OF THE INVENTION

Field of the Invention

This specification relates to a method for transmitting and/or receiving signals in a wireless LAN system and, most particularly, to a method and device for transmitting a frame by controlling transmission power in a MIMO and channel aggregation environment.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

Technical Objects

This specification proposes a method and device for transmitting a frame by controlling transmission power in a MIMO and channel aggregation environment in a wireless LAN system.

Technical Solutions

This specification proposes a method and device for transmitting a frame by controlling transmission power in a MIMO and channel aggregation environment.

This embodiment proposes a method of generating a frame for controlling a transmit power in a MIMO and channel aggregation situation of an 802.11ay system. Since the transmit power cannot be controlled in a MIMO and channel aggregation situation by using the DMG TPC method of a 11ad system, proposed herein is a method for performing an efficient TPC by adding information to a frame that is defined in 11ad.

Firstly, the terms will be defined. A Link Measurement Request frame and a Link Measurement Report frame may correspond to an Enhanced Directional Multi-Gigabit (EDMG) frame (or EDMG PPDU), which is defined in the 802.11ay system. Therefore, EDMG may be applied to fields or sub-fields that are included in the Link Measurement Request frame and a Link Measurement Report, which will be described in detail later on.

A first station (STA) transmits a Link Measurement Request frame requesting Transmit Power Control (TPC) information to a second STA.

The first STA receives a Link Measurement Report frame from the second STA, which is transmitted as a response to the Link Measurement Request frame.

The Link Measurement Request frame and the Link Measurement Report frame may be defined as described below.

The Link Measurement Request frame includes a TPC Configuration field.

The TPC Configuration field includes a first sub-field and a second sub-field.

The first sub-field includes information on whether or not the Link Measurement Request frame is transmitted through a channel on which channel aggregation is performed.

The second sub-field includes information on a number of Transmit chains that are used for transmitting the Link Measurement Request frame.

The Link Measurement Request frame is transmitted through the channel on which the channel aggregation is performed, the number of transmit chains is equal to an even number.

The Link Measurement Request frame may further include a Link Measurement Request field.

The Link Measurement Request field may include a third sub-field and a fourth sub-field.

The third sub-field may include information on a transmit power that is used for each of the transmit chains.

The fourth sub-field may include information on a maximum transmit power for each of the transmit chains.

The Link Measurement Report frame may include a rate adaptation control or first TPC field. The rate adaptation control or first TPC field may include information on a number of transmit chains that are being reported.

The Link Measurement Report frame may further include a second TPC field.

The second TPC field may include an Activity sub-field and a Link Margin sub-field on each of the reported transmit chains.

The Activity sub-field may include recommended activities recommended to the first STA by the second STA for the reported transmit chains.

Information on the recommended operations may be determined as one of No change preferred, Change MCS, Decrease transmit power, Increase transmit power, Fast session transfer, Power conserve mode, and Perform Sector Level Sweep (SLS).

The Link Margin sub-field may include information on a link margin for the first STA that is measured by the second STA.

If the information on the recommended operations is determined as No change preferred, the first STA may not change the transmit power of the transmit chain.

If the information on the recommended operations is determined as Decrease transmit power, the first STA may decrease the transmit power of the transmit chain.

If the information on the recommended operations is determined as Increase transmit power, the first STA may increase the transmit power of the transmit chain.

The Link Measurement Report frame may include a Link Adaptation Acknowledgment element.

The Link Adaptation Acknowledgment element may include an Activity sub-field.

The Activity sub-field may include information on an actual activity of the transmit chain after the first STA receives the recommended activities.

The channel on which the channel aggregation is performed may correspond to 2.16+2.16 GHz or 4.32+4.32 GHz.

BRIEF DESCRIPTION OF THE DRAWINGS

FIG. 9 is a diagram showing a PPDU structure that can be applied to the present invention.

FIG. 16 shows an example of an EDMG Link Measurement request frame format.

FIG. 18 shows an exemplary format of a Transmit Power Information field.

FIG. 19 shows an exemplary format of an EDMG Measurement Request field.

FIG. 20 shows an exemplary format of an EDMG Link Measurement report frame.

FIG. 21 shows another exemplary format of an EDMG Link Measurement report frame.

FIG. 25 may be configured identically as FIG. 24.

FIG. 26 shows an exemplary format of a DMG Link Adaptation Acknowledgment element.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
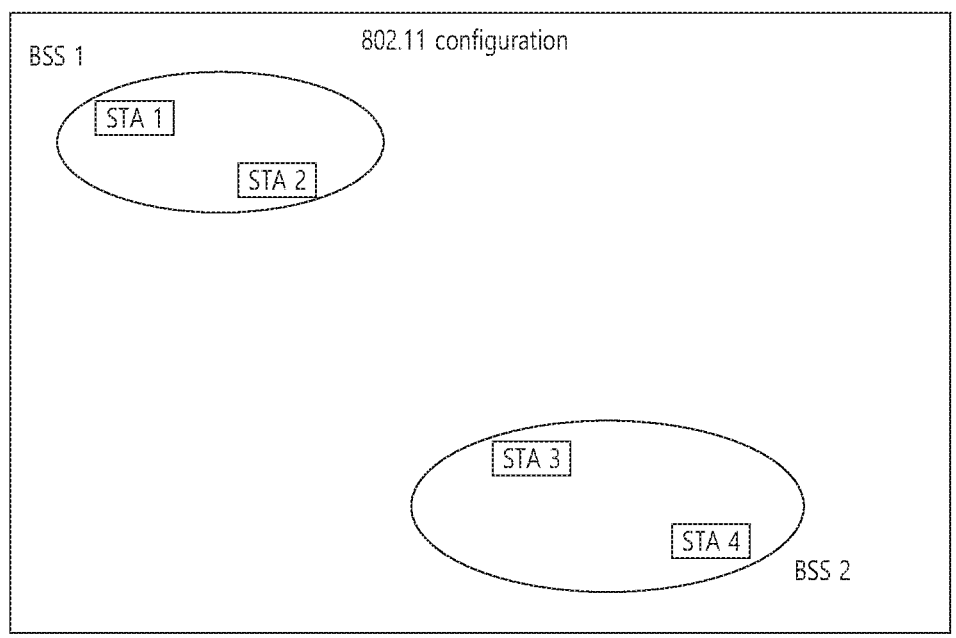
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
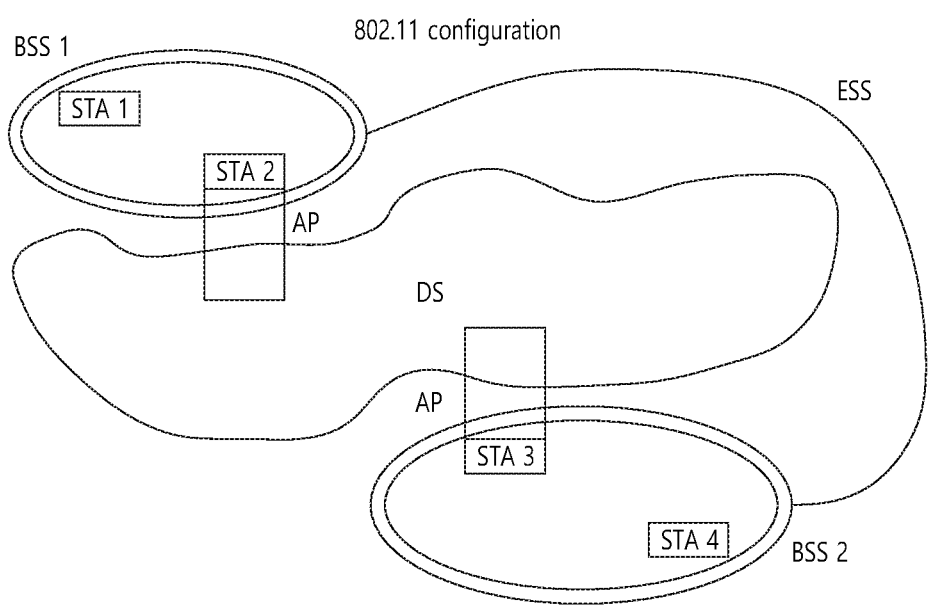
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
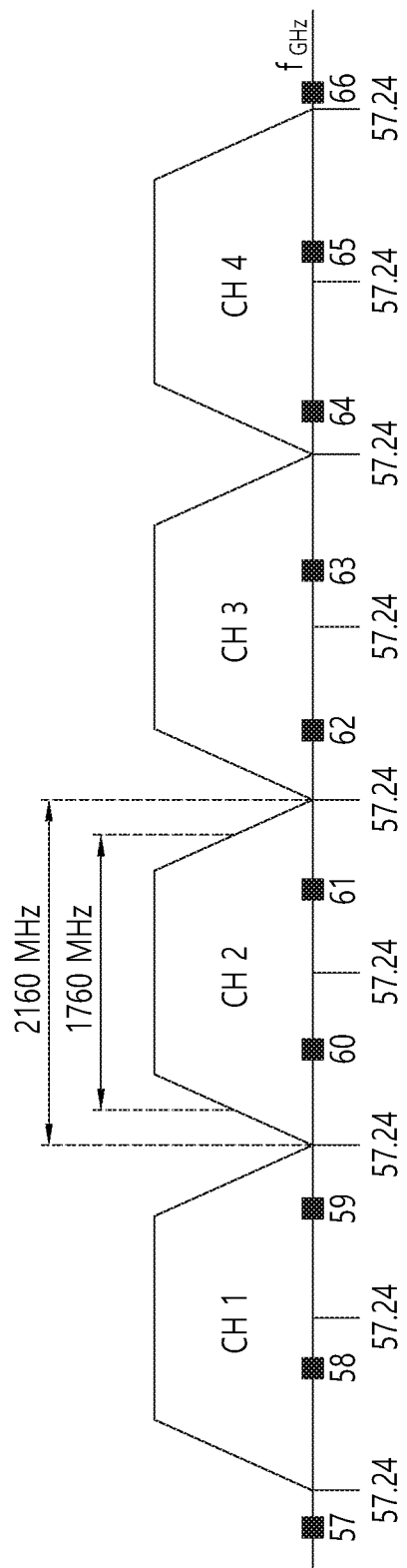
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
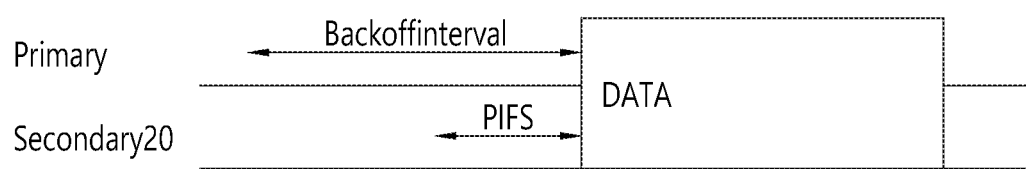
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
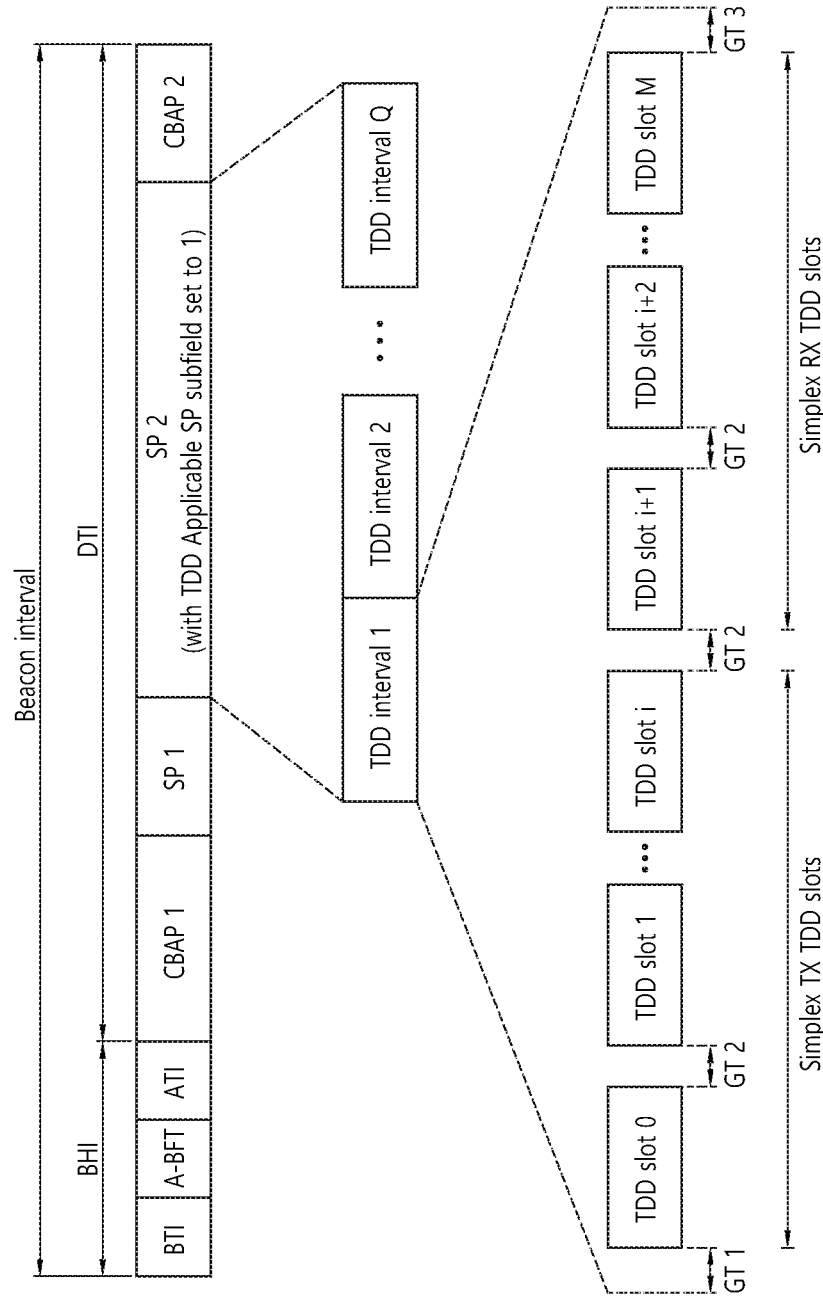
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2

SPs are allocated to the DCI, this is merely exemplary. And, therefore, the present invention is not necessarily required to be limited only to this.

FIG. 5 shows a structure of a TDD service period (SP). The TDD SP consists of one or more consecutive and adjacent TDD intervals (TDD interval 1, TDD interval 2, . . . , TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, . . . , TDD slot i), and the responder may receive data (or a frame) from the initiator in an RX TDD slot (TDD slot i+1, TDD slot i+2, . . . , TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY | 1 . . . 12 | (low power SC PHY) |
| (SC PHY) | 25 . . . 31 | |
| OFDM PHY | 13 . . . 24 | |

Figure 6:
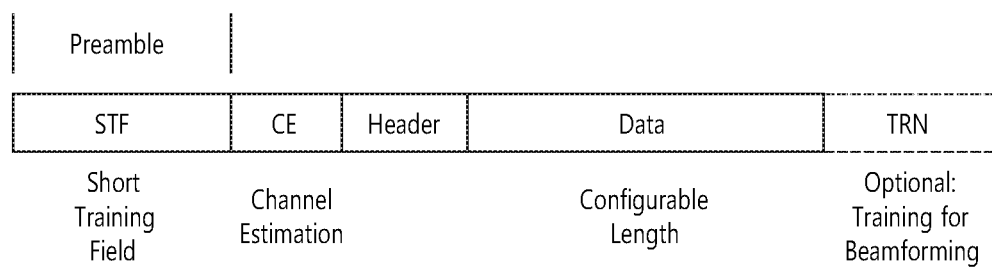
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
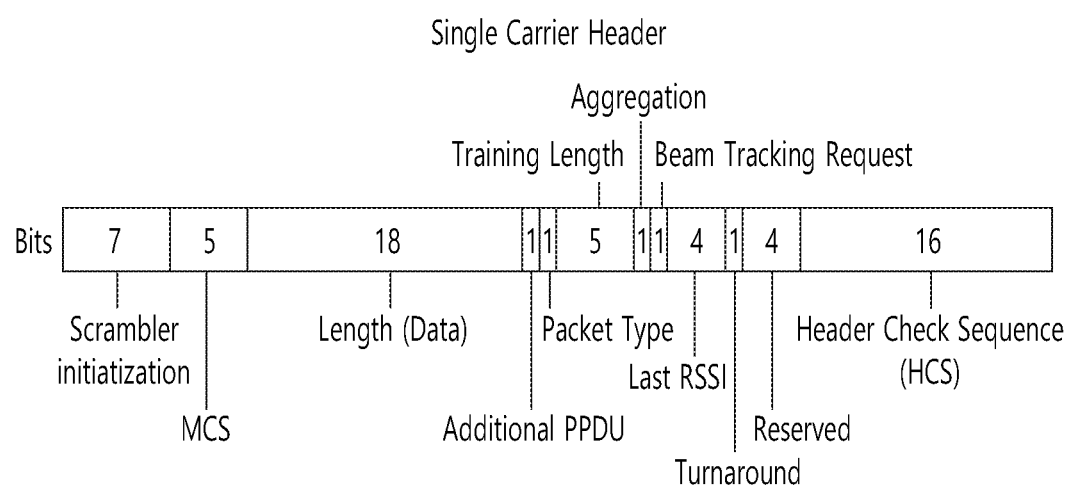
FIG. 7 and FIG. 8 are diagrams describing a configuration of a header field of the radio frame shown in FIG. 6.
Figure 8:
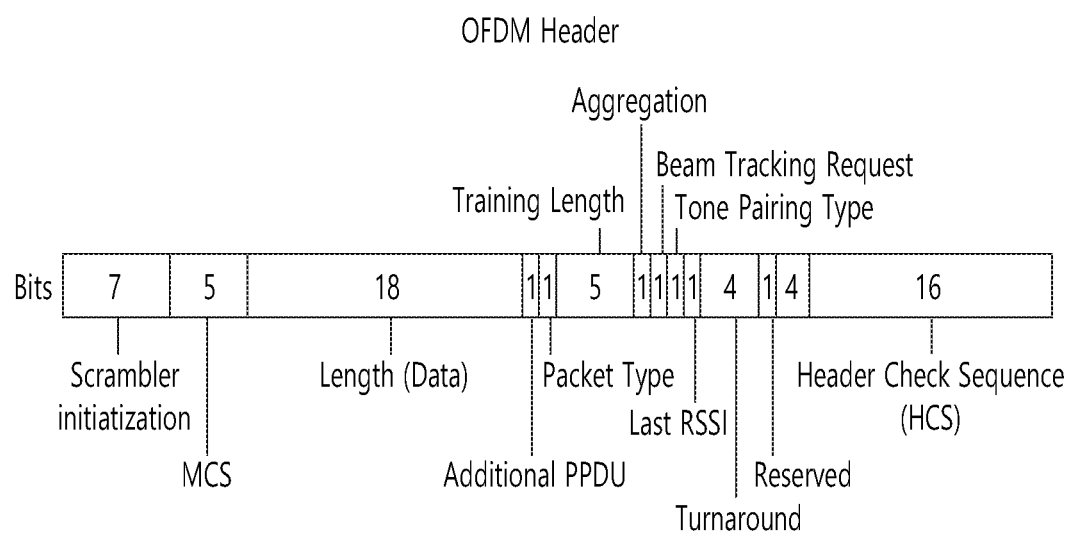

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
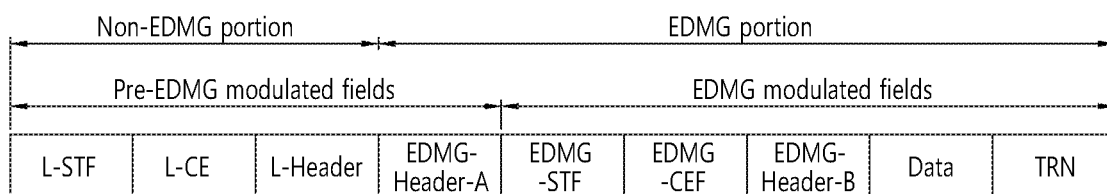
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
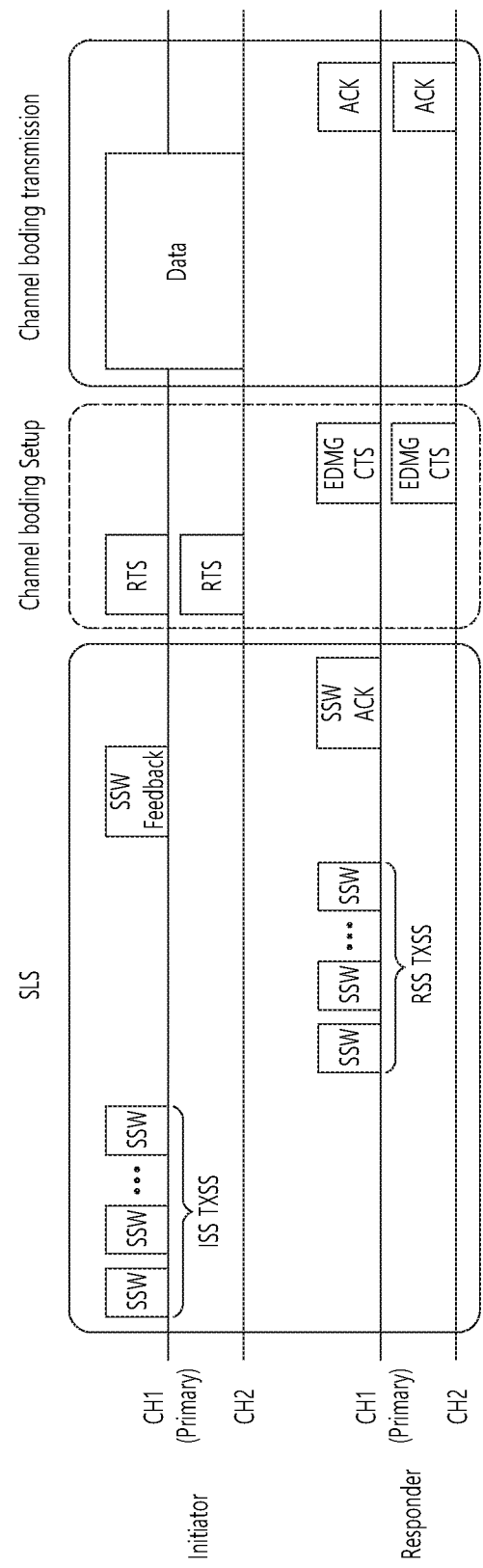
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
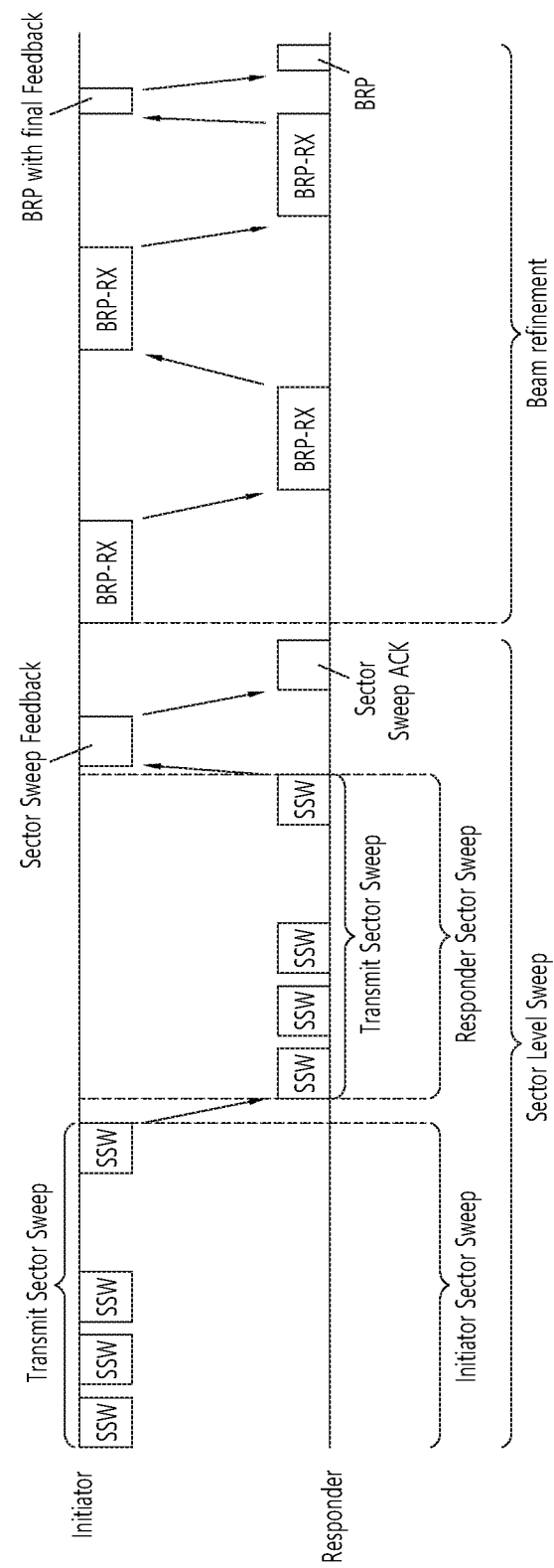
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
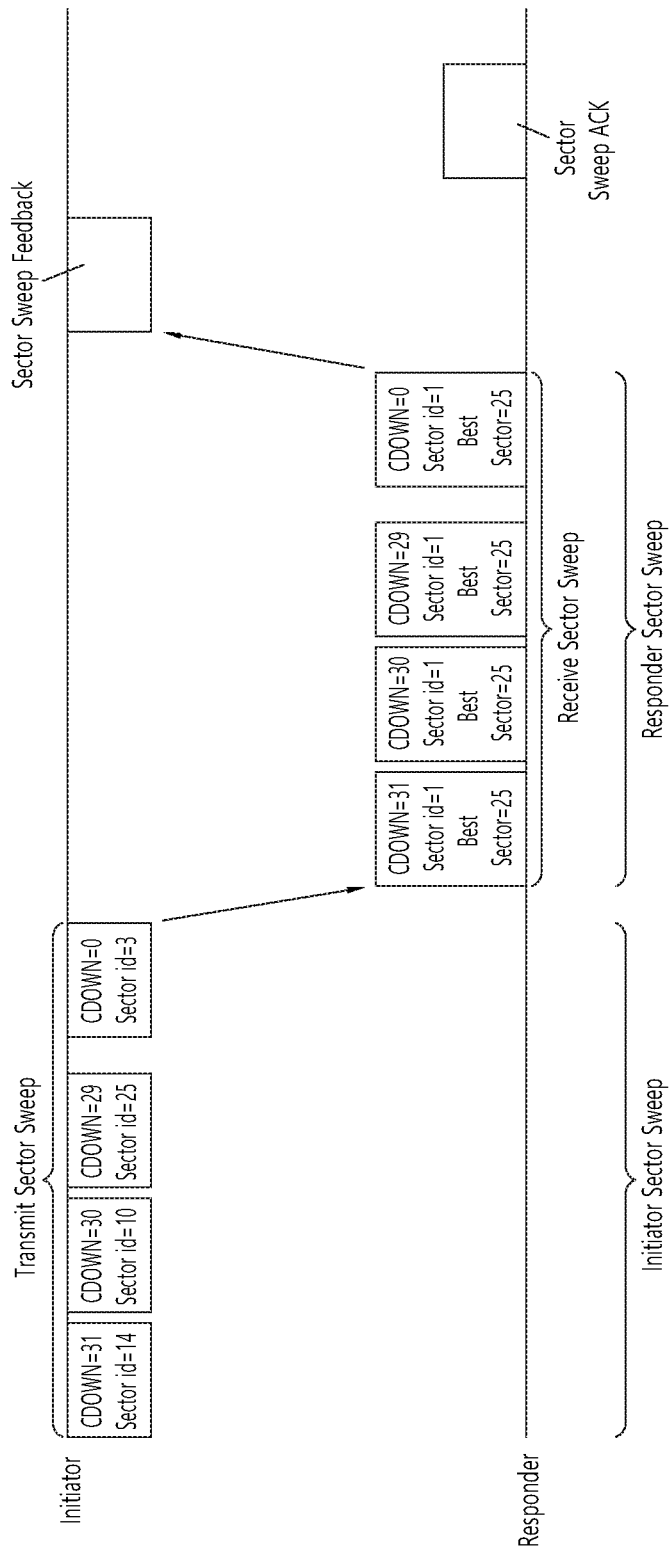
FIG. 13 and FIG. 14 is a diagram showing examples of a Sector Level Sweep (SLS) phase.
Figure 14:
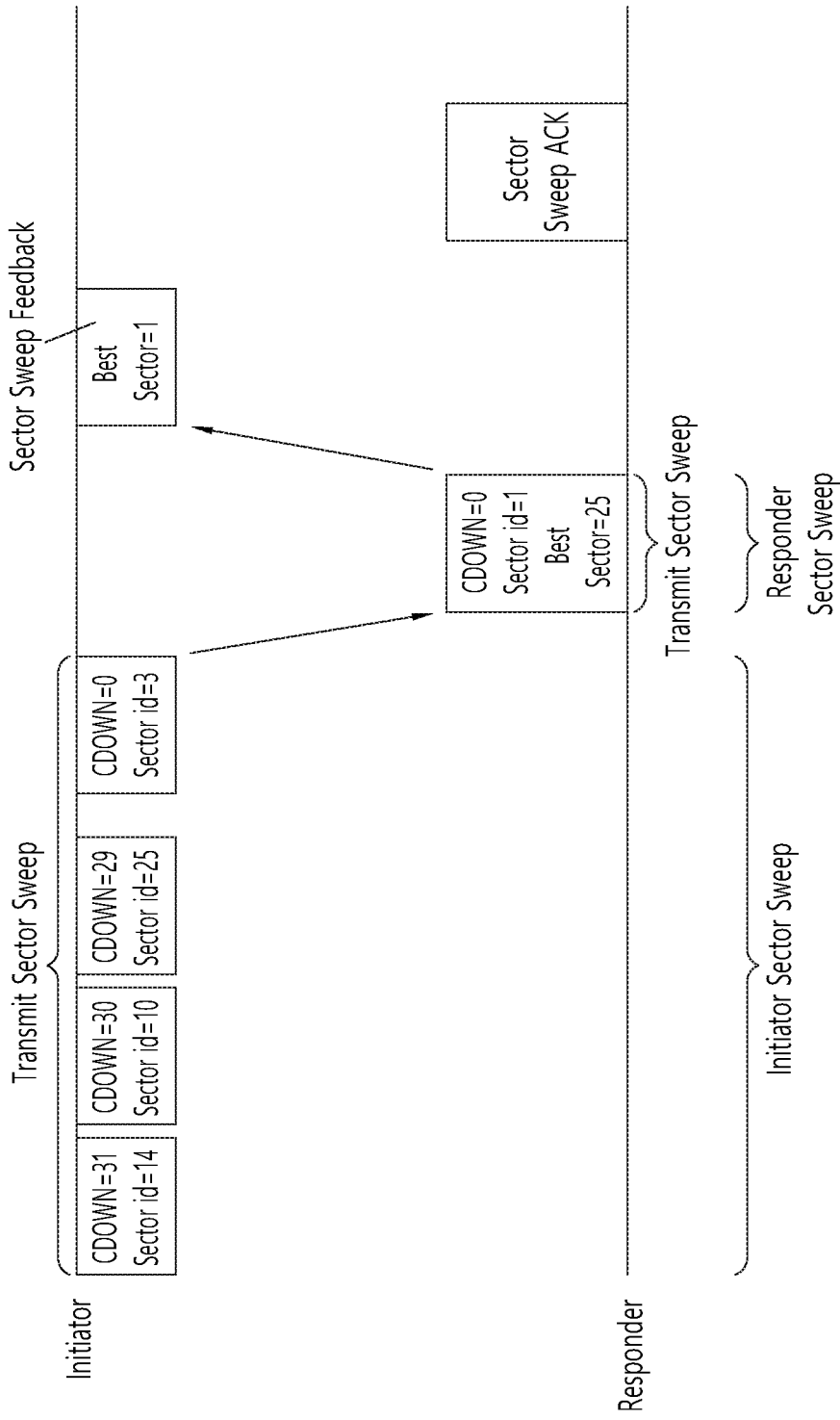

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2 Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3 Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. DMG Link Adaptation

Hereinafter, DMG Link adaptation that is proposed in 802.11ad will be described in detail.

The STA may transmit a Link Measurement Request frame in order to request an STA that is marked in an RA field of a frame so that the STA can send a response via Link Measurement Report frame. If the Link Measurement Request frame is transmitted within a PPDU that is defined in the DMG, the Link Measurement Report frame shall include a DMG Link Margin element. In order to transmit a frame to the STA marked in the RA field of the Link Measurement Report frame, a requesting STA may use values of the MCS, the SNR, and the Link Margin.

The requesting STA may aggregate the Link Measurement Request frame in an A-MPDU as defined in an A-MPDU content included in a data enabled immediate response context and A-MPDU contents MPDUs included in a control response context.

If a Dialog Token field of the Link Measurement Request frame is equal to a nonzero value (i.e., a value other than 0), the responding STA shall perform measurement in a next frame that is received from the requesting STA and shall send back (or return) a Link Measurement Report frame corresponding to the received frame.

The responding STA may aggregate a Link Measurement Report frame of an A-MPDU as defined in an A-MPDU content included in a data enabled immediate response context and A-MPDU contents MPDUs included in a control response context.

A DMG STA having a MAC address assigned with a same value as an RA field value of the Link Measurement Request frame shall transmit a Link Measurement Report frame targeted to the requesting STA. The RA field of the Link Measurement Report frame shall be the same as a TA field of the Link Measurement Request frame.

If a Dialog Token field of the Link Measurement Report frame is the same as the Dialog Token field that is equal to a nonzero value (i.e., not equal to 0) of the Link Measurement Request frame, the MCS, SNR, and Link Margin fields of the Link Measurement Report frame may be computed by using the PPDU. Herein, the PPDU corresponds to a next frame that is received from the requesting STA.

In case the Dialog Token field of the Link Measurement Request frame is equal to 0, the responding STA may configure the MCS field of the Link Measurement Report frame with an MCS value, which is calculated based on a random one of the frames received from the requesting STA.

The SNR field and the Link Margin field of the Link Measurement Report frame indicate the corresponding measurements based on a reception of a PPDU, which is used for generating an MCS feedback that is included in the same Link Measurement Report frame.

The Link Measurement Request and Report frames may be used for acquiring Link Margin information that may be used for determining the appropriate operations of the requesting STA (e.g., MCS change or transmit power control or FST initiation).

The STA may send (or transmit) an unsolicited Link Measurement Report frame being configured of a Dialog Token field that is set to 0.

Hereinafter, a DMG Transmit Power Control (TPC) will be described in detail.

A DMG STA that receives a Link Measurement Report frame, which includes a DMG Link Margin element indicating an increase or decrease in the transmit power, operates in accordance with the following rules.

If the STA implements recommendations marked in an Activity field of the Link Measurement Report, the STA shall transmit a Link Measurement Report frame including a DMG Link Adaptation Acknowledgement element. An Activity field of the DMG Link Adaptation Acknowledgement element shall be configured to have a value that is assigned to the Activity field of the received Link Margin Sub-element.

If the STA does not implement recommendations marked in an Activity field of the Link Measurement Report, the STA may transmit a Link Measurement Report including a DMG Link Adaptation Acknowledgement element. The Activity field of the DMG Link Adaptation Acknowledgement element shall be set to 0, which indicates that the transmit power has not been changed.

After acknowledging the reception of the Link Measurement Report, the STA shall not transmit a Link Measurement Report after 2×aPPDUMaxTime.

The DMG STA shall not include a DMG Link Adaptation Acknowledgement element in the Link Measurement Report frame as long as a frame is not transmitted from the Activity field in response to the Link Measurement Report frame, which is received with the same increase or decrease in the transmit power.

Hereinafter, Fast link adaptation will be described in detail.

Figure 15:
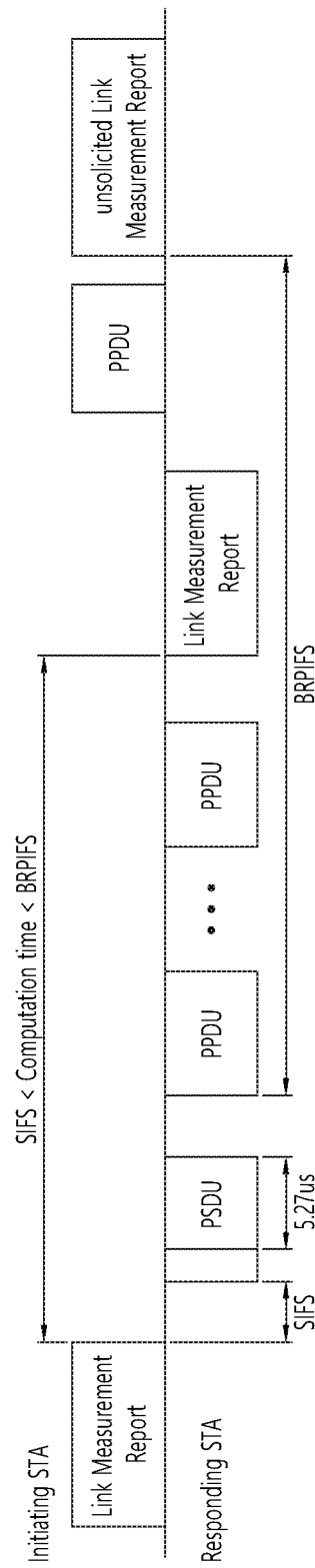
FIG. 15 shows an example of a Fast link adaptation procedure.

FIG. 15 shows an example of a Fast link adaptation procedure.

Referring to FIG. 15, by setting a Fast Link Adaptation field in a DMG Capabilities element of an STA to 1, the STA indicates a support for the Fast Link Adaptation. An STA that does not support Fast link adaptation sets the Fast Link Adaptation field in the DMG Capabilities element of the STA to 0. An STA that supports Fast link adaptation shall not initiate Fast link adaptation with its peer STA that does not support Fast link adaptation.

The STA that supports Fast link adaptation shall support a reverse direction protocol. As part of the Fast link adaptation, the STA that transmits the Link Measurement Request frame shall be an RD initiator, and the STA that responds with the Link Measurement Report frame shall be an RD responder. The transmission of the Link Measurement Request, the Link Measurement Report, and the frames defined below shall follow the rules of the reverse direction protocol.

The STA starts the Fast link adaptation by transmitting a Link Measurement Request frame having a subtype of Action No Ack and a Dialog Token field set to 0. A PPDU including a frame shall set an AGGREGATION parameter in a TXVECTOR to AGGREGATED, and the PPDU shall correspond to another frame requesting an immediate response and shall have a longer duration time (which is determined by a PHY-TXTIME.confirm primitive) than aMinPPDUDurationForDMGMeasurement.

Since the PPDU has an AGGREGATION parameter in the TXVECTOR being set to AGGREGATED, the PPDU may perform padding of the PSDU by using an MPDU delimiter having the size of 0. Accordingly, the transmission duration requirement is satisfied.

An STA supporting Fast link adaptation and receiving a Link Measurement Request frame having a subtype of Action No Ack and having a Dialog Token field that is set to 0, which is included in a PPDU having an AGGREGATION parameter of an RXVECTOR that is equal to AGGREGATED, shall send a response with a Link Measurement Report frame within a BRPIFS from the reception of the Link Measurement Request frame. A TPC report element, a DMG Link Margin element, and other fields that are transmitted in the Link Measurement Report frame shall reflect measurement values of the PPDU including a last received Link Measurement Request frame.

By transmitting a PPDU not including a frame requiring immediate response and having a duration that is longer than aMinPPDUDurationForDMGMeasurement, the STA responding in the Link Measurement Report shall maintain an IFS that is not longer than SIFS. All of the transmitted PPDUs shall use the same transmit power as the same MCS.

The transmitted Link Measurement Report frame shall have a subtype of Action No Ack and shall be transmitted by using MCS 1 and shall be transmitted within a PPDU that is fully configured of a total bandwidth parameter of the transmitter. Furthermore, the PPDU shall not include a frame that requires an immediate response and shall have a duration that is longer than aMinPPDUDurationForDMG-Measurement.

Among the above-described conditions for transmitting the Link Measurement Report frame, if at least one of the conditions is not satisfied, the STA may respond to the received Link Measurement Request frame in accordance with the above-described rules.

The STA supporting Fast link adaptation and receiving Link Measurement Report frame shall send a response with an unsolicited Link Measurement Report frame that is no longer than BRPIFS from the reception of the Link Measurement Report frame. A TPC report element, a DMG Link Margin element, and other fields being transmitted from the unsolicited Link Measurement Report frame, which starts from the received Link Measurement Report frame itself, shall reflect measurement values that are acquired from one or more PPDUs that are received by the STA transmitting the unreceived (i.e., unsolicited) Link Measurement Report frame. If the unsolicited Link Measurement Report frame is transmitted during a duration (or time period) that is longer than SIFS from the reception of the Link Measurement Report frame, by transmitting one or more PPDUs before issuing the unsolicited Link Measurement Report frame, the STA transmitting the unsolicited Link Measurement Report frame shall maintain the IFS to be longer than SIFS.

4. Embodiment Applicable to the Present Invention

As described above, a DMG TPC procedure for controlling transmit power through a Link Measurement request frame and a Link Measurement report frame is defined in 11ad. Since 11ay supports MIMO, the TPC method cannot be applied in a MIMO situation by using the conventional (or legacy) DMG TPC method. This specification proposes a method for performing MIMO TPC in 11ay.

EDMG TPC is proposed through a method of adding information to a frame that is defined in 11ad.

An EDMG Link Measurement request frame and an EDMG Link Measurement report frame are newly defined in 11ay for MIMO and Channel Aggregation (CA) TPC. In case of the EDMG TPC, it is assumed that it can be performed after MIMO Training is completed. In a MIMO situation, a different path loss may occur for each antenna, and, accordingly, a received SNR of each receive antenna may vary. Therefore, if TPC is performed for each antenna, the above-described case may be resolved.

4.1 EDMG Link Measurement Request Frame

Since 11ay supports up to a maximum of 8 antennas, an indication shall be made on a total number of TX antennas being used.

Moreover, since TPC shall be capable of being performed for each antenna, transmit power information for each antenna shall be notified. The proposed EDMG Link Measurement request frame will hereinafter be described in detail.

FIG. 16 shows an example of an EDMG Link Measurement request frame format.

A Link Measurement Request frame is transmitted by an STA in order to allow another STA to respond with a Link Measurement Report frame so as to perform link path loss and link margin estimation. In the EDMG BSS, an EDMG Link Measurement Request frame corresponds to an Action or Action No ACK frame.

Referring to FIG. 16, the Dialog Token field is set to a nonzero value, which is chosen in order to allow the STA sending the request to identify a transaction.

The Transmit Power Used field is set to a transmit power that is used for transmitting a frame including the Link Measurement Request.

The Max Transmit Power field provides an upper limit on the transmit power that is measured from an output of an antenna connector, which is to be used by the transmitting STA during its operation. The Max Transmit Power field is configured of an integer having a 2 s complement sign and having a length of 1 octet, and the Max Transmit Power field provides an upper limit value of a dBm scale for the transmit power that is measured from the output of the antenna connector that is used by the transmitting STA in the operating channel of the corresponding STA. A maximum tolerance for the value that is reported to the Max Transmit Power field is ±5 dB. The value of the Max Transmit Power field is equal to a minimum value of the maximum power that is authorized to be transmitted from the STA in an operating channel in accordance with a device capability, related policies, and a regulation authority.

The TPC Configuration field includes indications on the number of transmit antennas and channel sets.

The Transmit Power Information field exists optionally. In case this field exists, the field include a sub-field of the Transmit Power Information. The Transmit Power Information field may also be referred to as an EDMG Measurement Request field. An upper part of FIG. 16 shows a Link Measurement Request frame having the Transmit Power Information field existing therein, and a lower part of FIG. 16 shows a Link Measurement Request frame having the EDMG Measurement Request field existing therein. The EDMG Measurement Request field will hereinafter be described in detail.

Figure 17:
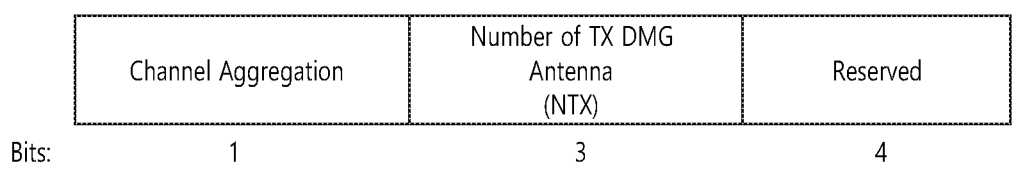
FIG. 17 shows an exemplary format of a TPC Configuration field.

FIG. 17 shows an exemplary format of a TPC Configuration field.

Referring to FIG. 17, a number of TX DMG Antennas indicates a total number of transmitting antennas to which the transmit power can be adapted. If a value of this field is greater than 0, Transmit Power Used and Max Transmit Power fields of the Link Measurement frame are reserved.

In case a Channel Aggregation sub-field of the TPC antenna configuration field is set to 1, a sub-field value for the number of TX DMG Antennas should be equal to an even-numbered value.

The TPC Configuration field is optionally provided. The TPC Configuration field indicates whether a frame including the Link Measurement Request is being transmitted over a 2.16+2.16 GHz channel or a 4.32+4.32 GHz channel, and the TPC Configuration field/also indicates the number of transmit chains used. B0 is used for indicating the usage of channel aggregation, B1-B3 are used for indicating a number of transmit chains, and B4-B7 are reserved. If B0 is set to 1, the number of transmit chains is equal to an even-numbered value.

FIG. 18 shows an exemplary format of a Transmit Power Information field.

Each TX antenna $ID_i$ sub-field includes a TX Antenna ID identifying Transmit Power Used and Max Transmit Power sub-fields, wherein $0 \leq i \leq NTX$, and wherein NTX corresponds to a value of a number of TX DMG Antennas sub-field within the TPC Configuration field.

In case a Channel Aggregation sub-field of the TPC Antenna Configuration field is set to 1, first NTX/2 TX antenna ID, Transmit Power Used and Max Transmit Power sub-fields correspond to a channel including a primary channel, and the remaining sub-fields correspond to a channel that does not include the primary channel.

Each Transmit Power Used sub-field is set to a transmit power of each TX antenna, which is used for transmitting a frame including the Link Measurement Request, wherein $0 \leq i \leq NTX$, and wherein NTX corresponds to a value of a number of TX DMG Antennas sub-field within the TPC Configuration field.

Each Max Transmit Power, sub-field provides an upper limit on the transmit power of each TX antenna that is measured from an output of an antenna connector, which may be used by the transmitting STA during its operation, wherein $0 \leq i \leq NTX$, and wherein NTX corresponds to a value of a number of TX DMG Antennas sub-field within the TPC Configuration field. The Max Transmit Power field is configured of an integer having a 2 s complement sign and having a length of 1 octet, and the Max Transmit Power field provides an upper limit value of a dBm scale for the transmit power that is measured from the output of the antenna connector that is used by the transmitting STA in its operating channel A maximum tolerance for the value that is reported to the Max Transmit Power field is ±5 dB. The value of the Max Transmit Power field is equal to a minimum value of the maximum power that is authorized to be transmitted from the STA in an operating channel in accordance with a device capability, related policies, and a regulation authority.

FIG. 19 shows an exemplary format of an EDMG Measurement Request field.

The EDMG Measurement Request field of FIG. 19 has a format excluding each TX Antenna $ID_i$ sub-field from the Transmit Power Information field of FIG. 18, and the EDMG Measurement Request field is defined in 11ay.

Referring to FIG. 19, the EDMG Measurement Request field exists optionally, and the EDMG Measurement Request field indicates a transmit power (Transmit Power Used$_{1 \ldots NTX}$) and a maximum transmit power limit (Max Transmit Power$_{1 \ldots NTX}$) of each transmit chain being used for transmitting a frame including the Link Measurement Request. And, in case the Transmit Power Used field and the Max Transmit Power field of the Link Measurement Request frame exist, the EDMG Measurement Request field is reserved.

4.2 EDMG Link Measurement Report Frame

After an STA receiving the EDMG Link Measurement request frame performs measurement, the STA shall transmit a report frame on the measurement result. The received frame includes an ID and transmit power information per antenna. After receiving the frame, measurement is performed on the received frame.

Since the measurement results for all of the antennas should be included in the report frame, indication should be made on the total number of measurements that have been performed.

Additionally, a TPC report element is included in the report frame, and, since transmit power information of the EDMG Link Measurement report frame should be included in the TPC report element, indication should be made on the TX antenna through which the corresponding report frame has been transmitted.

The measurement result shall be reported as many times as the number of power information fields of each antenna of the received frame. The information that shall be included in the measurement results for each antenna power information field is as described below.

Activity—This corresponds to a conventionally defined field, and since the transmit power may be increased or decreased per antenna, the activity field shall be respectively reported for all of the request frames.

EDMG MCS—MCS of each request frame

Link Margin—Link margin of each request frame

SNR—SNR of each request frame

Additionally, Antenna ID, power information, and link margin information may be included in the EDMG TPC Report Element for each TX Antenna that is used for transmitting the Report frame. By reporting the measurement, which corresponds to a result of the request frame, and, at the same time, by transmitting an antenna ID for the TX antenna, which transmits the report frame, and the power information and link margin information of each antenna, the STA transmitting the report frame may have an effect of requesting a TPC.

The proposed EDMG Link Measurement report frame is as described below.

FIG. 20 shows an exemplary format of an EDMG Link Measurement report frame.

FIG. 21 shows another exemplary format of an EDMG Link Measurement report frame.

The Measurement Configuration of FIG. 20 may correspond to the Rate Adaptation Control field/TPC field of FIG. 21. The EDMG Link Measurement field of FIG. 20 may correspond to the EDMG TPC field of FIG. 21. Herein, N of FIG. 20 and FIG. 22, which will be described in detail later on, is the same as NTX (i.e., a number of TX DMG Antennas), which is defined in FIG. 21.

Referring to FIG. 21, the Rate Adaptation Control/EDMG TPC field includes a Number of Space-Time Streams reported (NSTS), and an indication indicating whether or not the corresponding element includes a selection field that is used in Rate Adaptation and TPC.

A Parameters Across RX Chains field exists optionally. This field is included when a sub-field of a parameter exists in an RX chain.

A Parameters across PPDUs field exists optionally. In case this field exists, this field includes a sub-field of parameters across PPDUs.

A Parameters across LDPC Codewords field exists optionally. In case this field exists, this field includes a sub-field of LDPC codewords across PPDUs.

An inter-SC block field or an inter-OFDM symbol field exists optionally. In case this field exists, this field includes a sub-field of parameters across (or throughout) the entire SC block or OFDM symbol.

An EDMG TPC field exists optionally. In case this field exists, this field includes activity and link margin of each of the reported TX chain.

Figure 22:
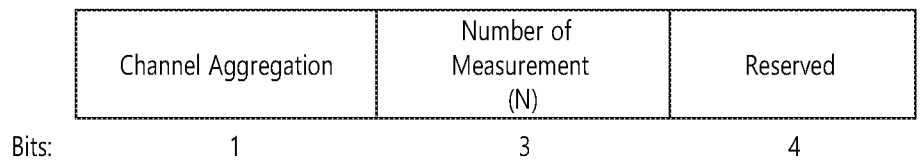
FIG. 22 shows an exemplary format of a Measurement Configuration field.

FIG. 22 shows an exemplary format of a Measurement Configuration field.

Referring to FIG. 22, a Number of Measurement sub-field indicates a total number of measurements required by the Link Measurement Request frame. A value of this field is equal to a value of a sub-field of a Number of TX DMG Antennas within the Link Measurement frame. If the value of this field is greater than 0, the Activity, MCS, Link Margin, and SNR fields of the DMG Link Margin element are reserved.

In case the Channel Aggregation sub-field of the TPC Antenna Configuration field is set to 1, a value of the Number of Measurement sub-field should be equal to an even number.

Figure 23:
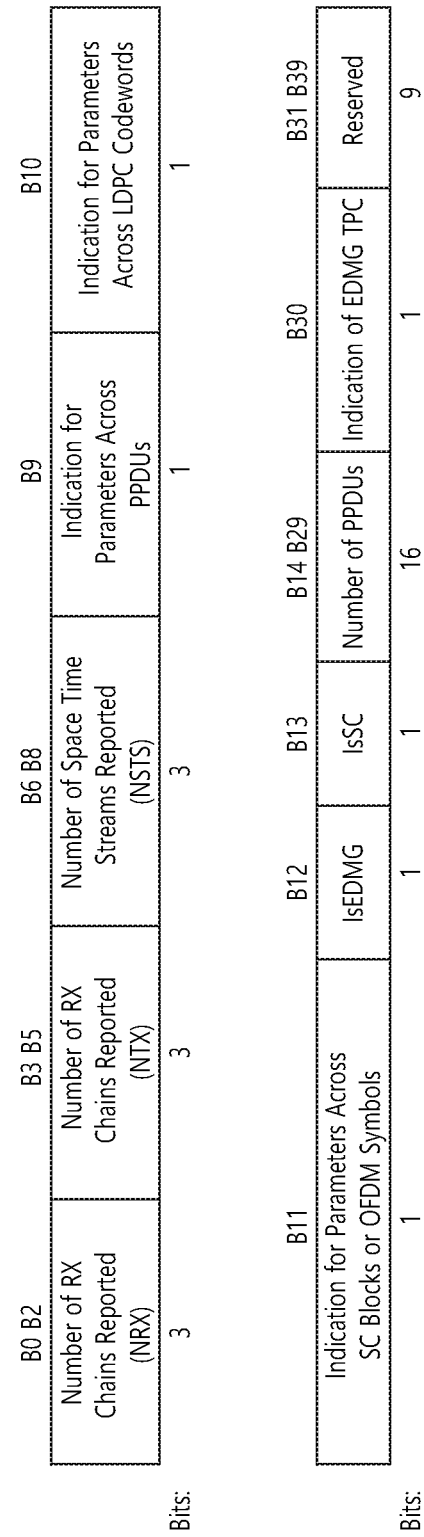
FIG. 23 shows an exemplary format of a Rate Adaptation Control field/TPC field.

FIG. 23 shows an exemplary format of a Rate Adaptation Control field/TPC field.

Referring to FIG. 23, a Number of RX chains Reported field indicates a number of reported RX chain entries. Each entry i corresponds to RX chain i. If the value of this field is greater than 0, the MCS, Link Margin, and SNR fields of the DMG Link Margin element are reserved.

A Number of TX chains Reported sub-field indicates a number of reported TX chain entries. Each entry i corresponds to TX chain i. If the value of this field is greater than 0, the MCS, Link Margin, and SNR fields of the DMG Link Margin element are reserved.

A Number of Space-Time Streams Reported (NSTS) sub-field indicates a number of reported space-time streams. Each entry i corresponds to a space-time stream. If the value of this field is greater than 0, the MCS, Link Margin, and SNR fields of the DMG Link Margin element are reserved. In case of a non-EDMG STA, this field is set to 1.

Unlike FIG. 22, a Channel Aggregation sub-field does not exist in the Rate Adaptation Control field/TPC field of FIG. 23.

Figure 24:
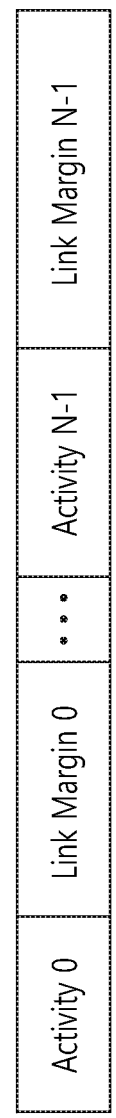
FIG. 24 shows an exemplary format of an EDMG Link Measurement field.

FIG. 24 shows an exemplary format of an EDMG Link Measurement field.

Referring to FIG. 24, in each Activity$_i$ sub-field, wherein $0 \le i \le N$, N indicates a value of a number of Measurement sub-fields within the Measurement Configuration field. An STA transmitting this element recommends that the peer STA indicated in the RA field of the Link Measurement Report frame performs the activity (or action). The method by which the transmitting STA determines an appropriate action for the peer STA varies depending upon the implementation. Preferred actions defined in the Activity sub-field are defined as shown below in the following table.

TABLE 2

| Preferred Action value | Meaning |
|---|---|
| 0 | No change preferred |
| 1 | Change(d) MCS |
| 2 | Decrease(d) transmit power |
| 3 | Increase(d) transmit power |
| 4 | Fast session transfer (FST) |

TABLE 2-continued

| Preferred Action value | Meaning |
|---|---|
| 5 | Power conserve mode |
| 6 | Perform SLS |
| 7-255 | Reserved |

In each Link Margin, sub-field, wherein $0 \le i \le N$, N indicates a value of a number of Measurement sub-fields within the Measurement Configuration field. This field includes a measured Link Margin of a data frame that is received from a peer STA, which is marked in the RA field of the Link Measurement Report frame, and is coded with 2s complement sign in decibel units. A value of −128 indicates that the Link Margin is not provided.

Figure 25:
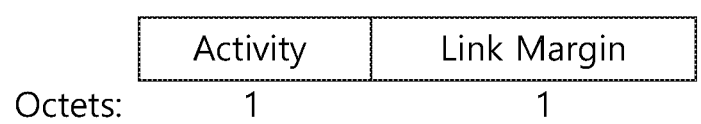
FIG. 25 shows an exemplary format of an EDMG TPC field.

FIG. 25 shows an exemplary format of an EDMG TPC field. FIG. 25 may be configured identically as FIG. 24. The EDMG TPC field of FIG. 25 exists optionally. If this field exists, this field includes Activity and Link Margin of each reported TX chain. If the DMG Link Margin element includes the EDMG TPC field, an indicator of the EDMG TPC field is set to 1. If the DMG Link Margin element does not include the EDMG TPC field, the indicator of the EDMG TPC field is set to 0.

FIG. 26 shows an exemplary format of a DMG Link Adaptation Acknowledgment element.

Referring to FIG. 26, the DMG Link Adaptation Acknowledgement element is included in an Optional Sub-elements field of the Link Measurement Report frame.

An Activity field is configured as an operation executed by an STA that has received this element after receiving a recommended activity (or action) in the Link Measurement Report frame.

An EDMG activity field is configured as an operation executed by an STA transmitting this element after receiving a recommended activity of each antenna. The recommended activity of each antenna is indicated in the EDMG Link Measurement within the DMG Link Margin element of the Link Measurement Report frame.

If a Number of Measurement Fields value within the DMG Link Margin element is set to a nonzero value, the Activity field is reserved and the EDMG Activity field exists.

A Reference Timestamp field includes lower 4 octets of a TSF timer value, which is sampled at a moment when a MAC corresponding to an end of a PPP reception receives a PHY-CCA.indication (IDLE) primitive.

Figure 27:
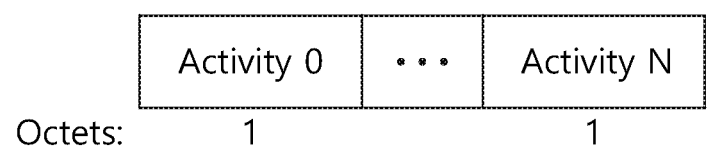
FIG. 27 shows an exemplary format of an EDMG Activity field.

FIG. 27 shows an exemplary format of an EDMG Activity field.

Referring to FIG. 27, in each Activity$_i$ sub-field, wherein $0 \le i \le N$, N indicates a value of a number of Measurement sub-fields within the Measurement Configuration field, and each Activity, sub-field indicates the activity of each antenna.

Hereinafter, an EDMG TPC procedure will be described in detail.

The EDMG TPC shall be configured after establishing a MIMO beamforming link.

The STA may set the TX DMG Antenna sub-field within the TPC Configuration to a nonzero value and may request another STA to respond with a Link Measurement Report frame including a DMG Link Margin element, which reports a Link Margin, and may then transmit the Link Measurement Request frame. If the TX DMG Antenna Number field of each antenna is set to 0, a Transmit Power Information field is reserved.

The Transmit Power Information field is configured of NTX TX Antenna ID, Transmit Power Used, and Max Transmit Power fields of each TX antenna. A value of the NTX is indicated in the TX DMG antenna sub-field of the TPC Configuration.

The STA that has received the Link Measurement Request frame having the TX DMG Antenna Number field set to a nonzero value within the TPC Configuration shall transmit the Link Measurement Report frame when the number of Measurement sub-fields within the DMG Link Margin element is set to a nonzero value.

The Transmit Power Information field is configured of NTX TX Antenna ID, Transmit Power Used, and Max Transmit Power fields of each TX antenna. A value of the NTX is indicated in the TX DMG antenna sub-field of the TPC Configuration.

N number of Activity and Link Margin sub-fields, which correspond to the measurement result, exist in the EDMG Link Measurement field within the DMG Link Margin element.

An EDMG TPC field within the DMG Link Margin element includes TX Antenna Number sub-field and TX Antenna ID and Transmit Power Used sub-fields of each TX antenna, which is used for transmitting the Link Measurement Report frame including the DMG Link Margin element.

An EDMG STA that receives a Link Measurement Report frame, which includes a DMG Link Margin element indicating an increase or decrease in the transmit power, operates in accordance with the following rules.

If the STA implements recommendations marked in an EDMG Activity field of the Link Measurement Report, the STA shall transmit a Link Measurement Report frame including an EDMG Activity field within a Link Measurement Acknowledgment field. The EDMG Activity field of the Link Adaptation Acknowledgment element shall be set to an Activity field value of the received EDMG Link Measurement.

If the STA does not implement recommendations marked in an EDMG Activity field of the Link Measurement Report, the STA may transmit a Link Measurement Report including an EDMG Activity field within a Link Adaptation Acknowledgement element. The EDMG Activity field of the Link Adaptation Acknowledgement element shall be set to 0, which indicates that the transmit power of each antenna has not been changed.

After acknowledging the reception of the Link Measurement Report, the STA shall not transmit a Link Measurement Report after 2×aPPDUMaxTime.

The EDMG STA shall not include a Link Adaptation Acknowledgement element in the Link Measurement Report frame if a frame is not transmitted from the EDMG Activity field in response to the Link Measurement Report frame, which is received with the same increase or decrease in the transmit power.

Figure 28:
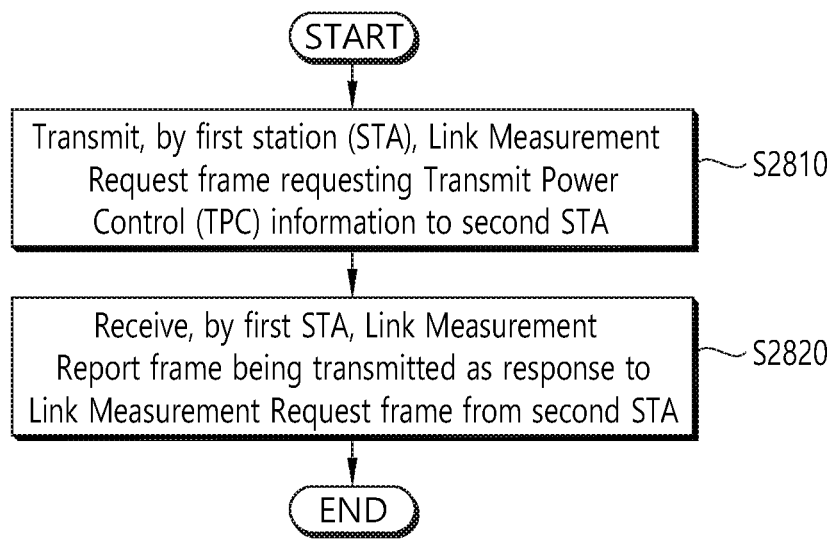
FIG. 28 is a procedure flow chart of a transmitting device for transmitting a frame in a MIMO and channel aggregation situation according to an exemplary embodiment of the present invention.

FIG. 28 is a procedure flow chart of a transmitting device for transmitting a frame in a MIMO and channel aggregation situation according to an exemplary embodiment of the present invention.

This embodiment proposes a method of generating a frame for controlling a transmit power in a MIMO and channel aggregation situation of an 802.11ay system. Since the transmit power cannot be controlled in a MIMO and channel aggregation situation by using the DMG TPC method of a 11ad system, proposed herein is a method for performing an efficient TPC by adding information to a frame that is defined in 11ad.

Firstly, the terms will be defined. A Link Measurement Request frame and a Link Measurement Report frame may correspond to an Enhanced Directional Multi-Gigabit (EDMG) frame (or EDMG PPDU), which is defined in the 802.11ay system. Therefore, EDMG may be applied to fields or sub-fields that are included in the Link Measurement Request frame and a Link Measurement Report, which will be described in detail later on.

In step S2810, a first station (STA) transmits a Link Measurement Request frame requesting Transmit Power Control (TPC) information to a second STA.

In step S2820, the first STA receives a Link Measurement Report frame from the second STA, which is transmitted as a response to the Link Measurement Request frame.

The Link Measurement Request frame and the Link Measurement Report frame may be defined as described below.

The Link Measurement Request frame includes a TPC Configuration field.

The TPC Configuration field includes a first sub-field and a second sub-field.

The first sub-field includes information on whether or not the Link Measurement Request frame is transmitted through a channel on which channel aggregation is performed.

The second sub-field includes information on a number of Transmit chains that are used for transmitting the Link Measurement Request frame.

The Link Measurement Request frame is transmitted via the channel on which the channel aggregation is performed, the number of transmit chains is equal to an even number.

The Link Measurement Request frame may further include a Link Measurement Request field.

The Link Measurement Request field may include a third sub-field and a fourth sub-field.

The third sub-field may include information on a transmit power that is used for each of the transmit chains.

The fourth sub-field may include information on a maximum transmit power for each of the transmit chains.

The Link Measurement Report frame may include a rate adaptation control or first TPC field. The rate adaptation control or first TPC field may include information on a number of transmit chains that are being reported.

The Link Measurement Report frame may further include a second TPC field.

The second TPC field may include an Activity sub-field and a Link Margin sub-field on each of the reported transmit chains.

The Activity sub-field may include recommended activities recommended to the first STA by the second STA for the reported transmit chains.

Information on the recommended operations may be determined as one of No change preferred, Change MCS, Decrease transmit power, Increase transmit power, Fast session transfer, Power conserve mode, and Perform Sector Level Sweep (SLS).

The Link Margin sub-field may include information on a link margin for the first STA that is measured by the second STA.

If the information on the recommended operations is determined as No change preferred, the first STA may not change the transmit power of the transmit chain.

If the information on the recommended operations is determined as Decrease transmit power, the first STA may decrease the transmit power of the transmit chain.

If the information on the recommended operations is determined as Increase transmit power, the first STA may increase the transmit power of the transmit chain.

The Link Measurement Report frame may include a Link Adaptation Acknowledgment element.

The Link Adaptation Acknowledgment element may include an Activity sub-field.

The Activity sub-field may include information on an actual activity of the transmit chain after the first STA receives the recommended activities.

The channel on which the channel aggregation is performed may correspond to 2.16+2.16 GHz or 4.32+4.32 GHz.

Figure 29:
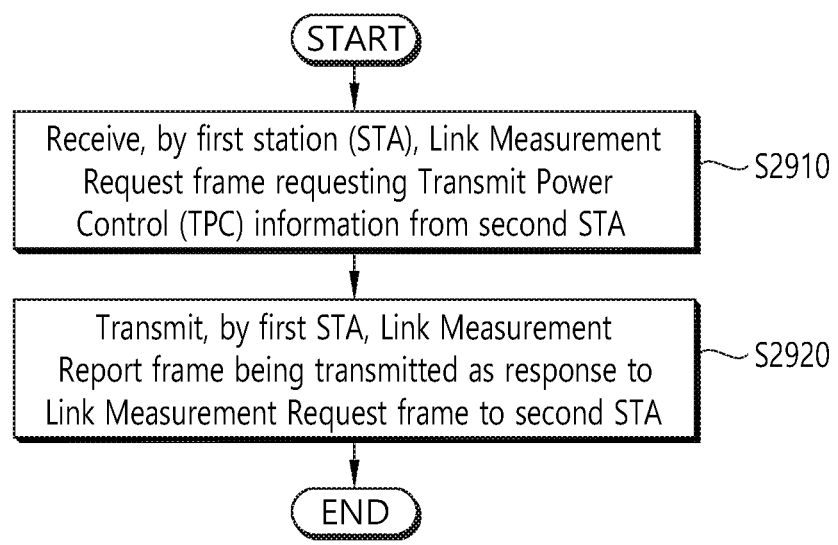
FIG. 29 is a procedure flow chart of a receiving device for receiving a frame in a MIMO and channel aggregation situation according to an exemplary embodiment of the present invention.

FIG. 29 is a procedure flow chart of a receiving device for receiving a frame in a MIMO and channel aggregation situation according to an exemplary embodiment of the present invention.

This embodiment proposes a method of generating a frame for controlling a transmit power in a MIMO and channel aggregation situation of an 802.11ay system. Since the transmit power cannot be controlled in a MIMO and channel aggregation situation by using the DMG TPC method of a 11ad system, proposed herein is a method for performing an efficient TPC by adding information to a frame that is defined in 11ad.

Firstly, the terms will be defined. A Link Measurement Request frame and a Link Measurement Report frame may correspond to an Enhanced Directional Multi-Gigabit (EDMG) frame (or EDMG PPDU), which is defined in the 802.11ay system. Therefore, EDMG may be applied to fields or sub-fields that are included in the Link Measurement Request frame and a Link Measurement Report, which will be described in detail later on.

In step S2910, a first station (STA) receives a Link Measurement Request frame requesting Transmit Power Control (TPC) information to a second STA.

In step S2920, the first STA transmits a Link Measurement Report frame from the second STA, which is transmitted as a response to the Link Measurement Request frame.

The Link Measurement Request frame and the Link Measurement Report frame may be defined as described below.

The Link Measurement Request frame includes a TPC Configuration field.

The TPC Configuration field includes a first sub-field and a second sub-field.

The first sub-field includes information on whether or not the Link Measurement Request frame is transmitted through a channel on which channel aggregation is performed.

The second sub-field includes information on a number of Transmit chains that are used for transmitting the Link Measurement Request frame.

The Link Measurement Request frame is transmitted via the channel on which the channel aggregation is performed, the number of transmit chains is equal to an even number.

The Link Measurement Request frame may further include a Link Measurement Request field.

The Link Measurement Request field may include a third sub-field and a fourth sub-field.

The third sub-field may include information on a transmit power that is used for each of the transmit chains.

The fourth sub-field may include information on a maximum transmit power for each of the transmit chains.

The Link Measurement Report frame may include a rate adaptation control or first TPC field. The rate adaptation control or first TPC field may include information on a number of transmit chains that are being reported.

The Link Measurement Report frame may further include a second TPC field.

The second TPC field may include an Activity sub-field and a Link Margin sub-field on each of the reported transmit chains.

The Activity sub-field may include recommended activities recommended to the first STA by the second STA for the reported transmit chains.

Information on the recommended operations may be determined as one of No change preferred, Change MCS, Decrease transmit power, Increase transmit power, Fast session transfer, Power conserve mode, and Perform Sector Level Sweep (SLS).

The Link Margin sub-field may include information on a link margin for the first STA that is measured by the second STA.

If the information on the recommended operations is determined as No change preferred, the first STA may not change the transmit power of the transmit chain.

If the information on the recommended operations is determined as Decrease transmit power, the first STA may decrease the transmit power of the transmit chain.

If the information on the recommended operations is determined as Increase transmit power, the first STA may increase the transmit power of the transmit chain.

The Link Measurement Report frame may include a Link Adaptation Acknowledgment element.

The Link Adaptation Acknowledgment element may include an Activity sub-field.

The Activity sub-field may include information on an actual activity of the transmit chain after the first STA receives the recommended activities.

The channel on which channel aggregation is performed may correspond to 2.16+2.16 GHz or 4.32+4.32 GHz.

Figure 30:
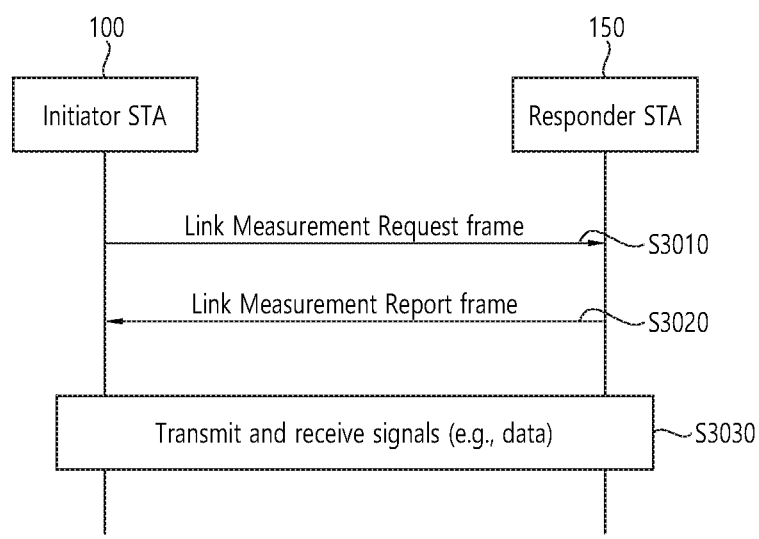
FIG. 30 shows a procedure for transmitting a frame in a MIMO and channel aggregation situation according to an exemplary embodiment of the present invention.

FIG. 30 shows a procedure for transmitting a frame in a MIMO and channel aggregation situation according to an exemplary embodiment of the present invention.

Firstly, the terms will be defined. A first STA may correspond to an initiator (100) requesting and controlling TPC, and a second STA may correspond to a responder (150) reporting the requested information.

In step S3010, a first station (STA) transmits a Link Measurement Request frame requesting Transmit Power Control (TPC) information to a second STA.

In step S3020, the first STA receives a Link Measurement Report frame from the second STA, which is transmitted as a response to the Link Measurement Request frame.

In step S3030, the first STA and the second STA controls the transmit power based on the Link Measurement Request and Report frames and transmits and receives a signal.

The Link Measurement Request frame and the Link Measurement Report frame may be defined as described below.

The Link Measurement Request frame includes a TPC Configuration field.

The TPC Configuration field includes a first sub-field and a second sub-field.

The first sub-field includes information on whether or not the Link Measurement Request frame is transmitted through a channel on which channel aggregation is performed.

The second sub-field includes information on a number of Transmit chains that are used for transmitting the Link Measurement Request frame.

The Link Measurement Request frame is transmitted via the channel on which the channel aggregation is performed, the number of transmit chains is equal to an even number.

The Link Measurement Request frame may further include a Link Measurement Request field.

The Link Measurement Request field may include a third sub-field and a fourth sub-field.

The third sub-field may include information on a transmit power that is used for each of the transmit chains.

The fourth sub-field may include information on a maximum transmit power for each of the transmit chains.

The Link Measurement Report frame may include a rate adaptation control or first TPC field. The rate adaptation control or first TPC field may include information on a number of transmit chains that are being reported.

The Link Measurement Report frame may further include a second TPC field.

The second TPC field may include an Activity sub-field and a Link Margin sub-field on each of the reported transmit chains.

The Activity sub-field may include recommended activities recommended to the first STA by the second STA for the reported transmit chains.

Information on the recommended operations may be determined as one of No change preferred, Change MCS, Decrease transmit power, Increase transmit power, Fast session transfer, Power conserve mode, and Perform Sector Level Sweep (SLS).

The Link Margin sub-field may include information on a link margin for the first STA that is measured by the second STA.

If the information on the recommended operations is determined as No change preferred, the first STA may not change the transmit power of the transmit chain.

If the information on the recommended operations is determined as Decrease transmit power, the first STA may decrease the transmit power of the transmit chain.

If the information on the recommended operations is determined as Increase transmit power, the first STA may increase the transmit power of the transmit chain.

The Link Measurement Report frame may include a Link Adaptation Acknowledgment element.

The Link Adaptation Acknowledgment element may include an Activity sub-field.

The Activity sub-field may include information on an actual activity of the transmit chain after the first STA receives the recommended activities.

The channel on which channel aggregation is performed may correspond to 2.16+2.16 GHz or 4.32+4.32 GHz.

5. Device Configuration

Figure 31:
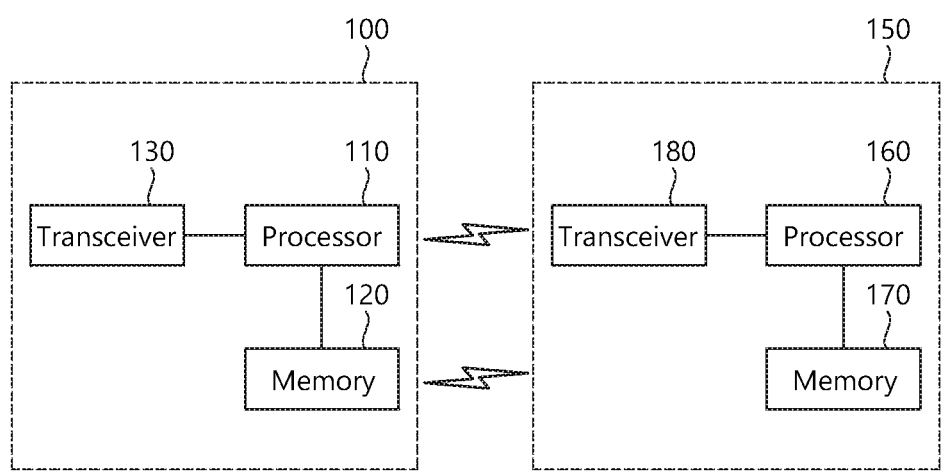
FIG. 31 is a diagram showing a device for implementing the above-described method.

FIG. 31 is a diagram describing a device for implementing the above-described method.

A wireless device (100) of FIG. 31 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement functions, processes, and/or methods proposed in the present specification. For example, the processor (110, 160) may perform the aforementioned operation according to the present embodiment.

Detailed operations of the processor (110) of the transmitting device are as described below. The processor (110) of the transmitting device transmits a Link Measurement Request frame requesting TPC information and receives a Link Measurement Report frame, which is transmitted as a response to the Link Measurement Request frame.

Detailed operations of the processor (160) of the receiving device are as described below. The processor (160) of the receiving device receives a Link Measurement Request frame requesting TPC information and transmits a Link Measurement Report frame, which is transmitted as a response to the Link Measurement Request frame.

Figure 32:
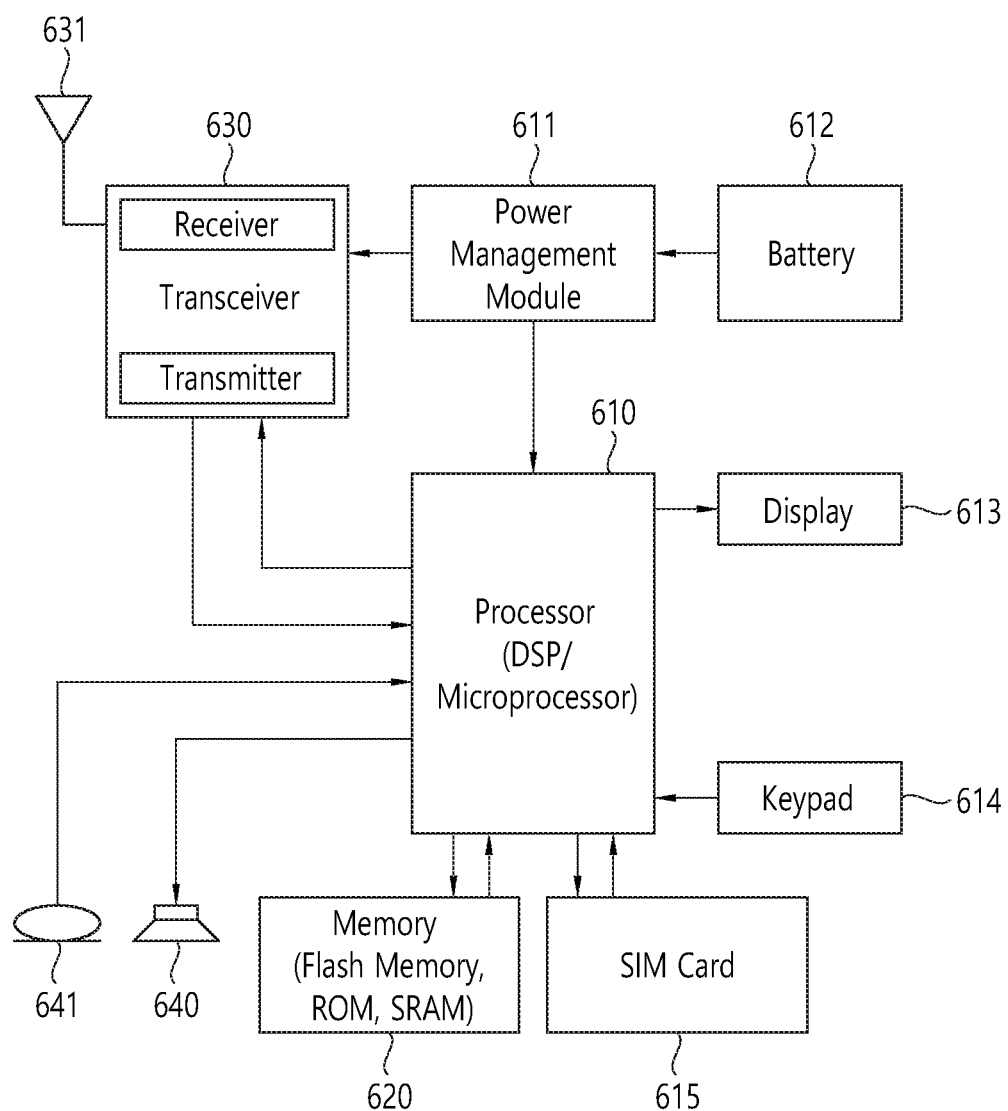
FIG. 32 shows a more detailed wireless device implementing an exemplary embodiment of the present invention.

FIG. 32 shows more detailed wireless device to implement an embodiment of the present invention. The present invention described above for the transmitting device or the receiving device may be applied to this embodiment.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods described in this description. Layers of the radio interface protocol may be implemented in the processor (610). The processor (610) may include ASIC, other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of the transmitting device, the processor (610) transmits a Link Measurement Request frame requesting TPC information and receives a Link Measurement Report frame as a response to the Link Measurement Request frame.

In case of the receiving device, the processor (610) receives a Link Measurement Request frame requesting TPC information and transmits a Link Measurement Report frame as a response to the Link Measurement Request frame.

The Link Measurement Request frame and the Link Measurement Report frame may be defined as described below.

The Link Measurement Request frame includes a TPC Configuration field.

The TPC Configuration field includes a first sub-field and a second sub-field.

The first sub-field includes information on whether or not the Link Measurement Request frame is transmitted through a channel on which channel aggregation is performed.

The second sub-field includes information on a number of Transmit chains that are used for transmitting the Link Measurement Request frame.

The Link Measurement Request frame is transmitted via the channel on which the channel aggregation is performed, the number of transmit chains is equal to an even number.

The Link Measurement Request frame may further include a Link Measurement Request field.

The Link Measurement Request field may include a third sub-field and a fourth sub-field.

The third sub-field may include information on a transmit power that is used for each of the transmit chains.

The fourth sub-field may include information on a maximum transmit power for each of the transmit chains.

The Link Measurement Report frame may include a rate adaptation control or first TPC field. The rate adaptation control or first TPC field may include information on a number of transmit chains that are being reported.

The Link Measurement Report frame may further include a second TPC field.

The second TPC field may include an Activity sub-field and a Link Margin sub-field on each of the reported transmit chains.

The Activity sub-field may include recommended activities recommended to the first STA by the second STA for the reported transmit chains.

Information on the recommended operations may be determined as one of No change preferred, Change MCS, Decrease transmit power, Increase transmit power, Fast session transfer, Power conserve mode, and Perform Sector Level Sweep (SLS).

The Link Margin sub-field may include information on a link margin for the first STA that is measured by the second STA.

If the information on the recommended operations is determined as No change preferred, the first STA may not change the transmit power of the transmit chain.

If the information on the recommended operations is determined as Decrease transmit power, the first STA may decrease the transmit power of the transmit chain.

If the information on the recommended operations is determined as Increase transmit power, the first STA may increase the transmit power of the transmit chain.

The Link Measurement Report frame may include a Link Adaptation Acknowledgment element.

The Link Adaptation Acknowledgment element may include an Activity sub-field.

The Activity sub-field may include information on an actual activity of the transmit chain after the first STA receives the recommended activities.

The channel on which channel aggregation is performed may correspond to 2.16+2.16 GHz or 4.32+4.32 GHz.

What is claimed is:

1. A method in a wireless LAN (WLAN) system, the method comprising:
    transmitting, by a first station (STA), a Link Measurement Request frame requesting Transmit Power Control (TPC) information to a second STA; and
    receiving, by the first STA, a Link Measurement Report frame from the second STA, the Link Measurement Report frame being transmitted as a response to the Link Measurement Request frame,
    wherein the Link Measurement Request frame includes a TPC Configuration field,
    wherein the TPC Configuration field includes a first sub-field and a second sub-field,
    wherein the first sub-field includes information on whether or not the Link Measurement Request frame is transmitted through a channel on which channel aggregation is performed,
    wherein the second sub-field includes information on a number of transmit chains being used for transmitting the Link Measurement Request frame, and
    wherein, based on the Link Measurement Request frame being transmitted through the channel on which the channel aggregation is performed, the number of transmit chains is equal to an even number.

2. The method of claim 1, wherein the Link Measurement Request frame further includes a Link Measurement Request field,
    wherein the Link Measurement Request field includes a third sub-field and a fourth sub-field, wherein the third sub-field includes information on a transmit power being used for each of the transmit chains, and wherein the fourth sub-field includes information on a maximum transmit power for each of the transmit chains.

3. The method of claim 1, wherein the Link Measurement Report frame includes a rate adaptation control or first TPC field, and wherein the rate adaptation control or first TPC field includes information on a number of reported transmit chains.

4. The method of claim 3, wherein the Link Measurement Report frame further includes a second TPC field, wherein the second TPC field includes an Activity sub-field and a Link Margin sub-field on each of the reported transmit chains, wherein the Activity sub-field includes recommended activities recommended to the first STA by the second STA for the reported transmit chains, wherein information on the recommended operations is determined as one of No change preferred, Change MCS, Decrease transmit power, Increase transmit power, Fast session transfer, Power conserve mode, and Perform Sector Level Sweep (SLS), and wherein the Link Margin sub-field includes information on a link margin for the first STA being measured by the second STA.

5. The method of claim 4, wherein, if the information on the recommended operations is determined as No change preferred, the first STA does not change the transmit power of the transmit chain, wherein, if the information on the recommended operations is determined as Decrease transmit power, the first STA decreases the transmit power of the transmit chain, and wherein, if the information on the recommended operations is determined as Increase transmit power, the first STA increases the transmit power of the transmit chain.

6. The method of claim 4, wherein the Link Measurement Report frame includes a Link Adaptation Acknowledgment element, wherein the Link Adaptation Acknowledgment element includes an Activity sub-field, and wherein the Activity sub-field includes information on an actual activity of the transmit chain after the first STA receives the recommended activities.

7. The method of claim 1, wherein the channel on which the channel aggregation is performed is 2.16+2.16 GHz or 4.32+4.32 GHz.

8. A station (STA) device in a wireless LAN (WLAN) system, the STA device comprising:
a memory;
a transceiver; and
a processor being operatively connected to the memory and the transceiver, wherein the processor is configured:
to transmit a Link Measurement Request frame requesting Transmit Power Control (TPC) information to another STA; and
to receive a Link Measurement Report frame from the other STA, the Link Measurement Report frame being transmitted as a response to the Link Measurement Request frame,
wherein the Link Measurement Request frame includes a TPC Configuration field, wherein the TPC Configuration field includes a first sub-field and a second sub-field, wherein the first sub-field includes information on whether or not the Link Measurement Request frame is transmitted through a channel on which channel aggregation is performed, wherein the second sub-field includes information on a number of transmit chains being used for transmitting the Link Measurement Request frame, and wherein, based on the Link Measurement Request frame being transmitted through the channel on which the channel aggregation is performed, the number of transmit chains is equal to an even number.

9. The STA device of claim 8, wherein the Link Measurement Request frame further includes a Link Measurement Request field, wherein the Link Measurement Request field includes a third sub-field and a fourth sub-field, wherein the third sub-field includes information on a transmit power being used for each of the transmit chains, and wherein the fourth sub-field includes information on a maximum transmit power for each of the transmit chains.

10. The STA device of claim 8, wherein the Link Measurement Report frame includes a rate adaptation control or first TPC field, and wherein the rate adaptation control or first TPC field includes information on a number of reported transmit chains.

11. The STA device of claim 10, wherein the Link Measurement Report frame further includes a second TPC field, wherein the second TPC field includes an Activity sub-field and a Link Margin sub-field on each of the reported transmit chains, wherein the Activity sub-field includes recommended activities recommended to the first STA by the second STA for the reported transmit chains, wherein information on the recommended operations is determined as one of No change preferred, Change MCS, Decrease transmit power, Increase transmit power, Fast session transfer, Power conserve mode, and Perform Sector Level Sweep (SLS), and wherein the Link Margin sub-field includes information on a link margin for the first STA being measured by the second STA.

12. The STA device of claim 11, wherein, if the information on the recommended operations is determined as No change preferred, the first STA does not change the transmit power of the transmit chain, wherein, if the information on the recommended operations is determined as Decrease transmit power, the first STA decreases the transmit power of the transmit chain, and wherein, if the information on the recommended operations is determined as Increase transmit power, the first STA increases the transmit power of the transmit chain.

13. The STA device of claim 11, wherein the Link Measurement Report frame includes a Link Adaptation Acknowledgment element, wherein the Link Adaptation Acknowledgment element includes an Activity sub-field, and wherein the Activity sub-field includes information on an actual activity of the transmit chain after the first STA receives the recommended activities.

14. The STA device of claim 8, wherein the channel on which the channel aggregation is performed is 2.16+2.16 GHz or 4.32+4.32 GHz.

15. A method in a wireless LAN (WLAN) system, the method comprising:
- receiving, by a first station (STA), a Link Measurement Request frame requesting Transmit Power Control (TPC) information from a second STA; and
- transmitting, by the first STA, a Link Measurement Report frame to the second STA, the Link Measurement Report frame being transmitted as a response to the Link Measurement Request frame,
- wherein the Link Measurement Request frame includes a TPC Configuration field,
- wherein the TPC Configuration field includes a first sub-field and a second sub-field,
- wherein the first sub-field includes information on whether or not the Link Measurement Request frame is transmitted through a channel on which channel aggregation is performed,
- wherein the second sub-field includes information on a number of transmit chains being used for transmitting the Link Measurement Request frame, and
- wherein, based on the Link Measurement Request frames being transmitted through the channel on which the channel aggregation is performed, the number of transmit chains is equal to an even number.

\* \* \* \* \*